United States Patent
Ahn et al.

(10) Patent No.: US 11,491,461 B2
(45) Date of Patent: Nov. 8, 2022

(54) METHOD OF DEPLETING AN ORGANOSILICON COMPONENT IN A MIXTURE USING A SORBENT COPOLYMER AND APPARATUS FOR PRACTICING THE METHOD

(71) Applicant: Dow Silicones Corporation, Midland, MI (US)

(72) Inventors: Dongchan Ahn, Midland, MI (US); Aaron Greiner, Midland, MI (US); Robert Huber, Midland, MI (US); James Thompson, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 601 days.

(21) Appl. No.: 16/604,352

(22) PCT Filed: Feb. 28, 2018

(86) PCT No.: PCT/US2018/020134
§ 371 (c)(1),
(2) Date: Oct. 10, 2019

(87) PCT Pub. No.: WO2018/169681
PCT Pub. Date: Sep. 20, 2018

(65) Prior Publication Data
US 2020/0156043 A1 May 21, 2020

Related U.S. Application Data

(60) Provisional application No. 62/470,904, filed on Mar. 14, 2017.

(51) Int. Cl.
*B01J 20/26* (2006.01)
*B01D 53/02* (2006.01)
(Continued)

(52) U.S. Cl.
CPC ............ *B01J 20/264* (2013.01); *B01D 53/02* (2013.01); *B01J 20/3085* (2013.01);
(Continued)

(58) Field of Classification Search
CPC . B01J 20/26; B01J 20/264; B01D 53/02; B01J 20/30; B01J 20/34; C02F 1/28; C08G 77/442
See application file for complete search history.

(56) References Cited

U.S. PATENT DOCUMENTS

| 2,676,182 A | 4/1954 | Daudt et al. |
| 4,584,355 A | 4/1986 | Blizzard et al. |

(Continued)

FOREIGN PATENT DOCUMENTS

| CA | 2386659 | 11/2009 |
| JP | 10017774 | 1/1998 |

(Continued)

OTHER PUBLICATIONS

Search report from corresponding China 201880015780.3 application, dated Jun. 22, 2021.

(Continued)

*Primary Examiner* — Youngsul Jeong
(74) *Attorney, Agent, or Firm* — Cathrine U. Brown

(57) ABSTRACT

A method and apparatus for removing an organosilicon component from a mixture are disclosed. The method and apparatus employ a copolymer of a di-alkenyl functional aromatic hydrocarbon and a polyorganosiloxane as the sorbent.

17 Claims, 1 Drawing Sheet

(51) Int. Cl.
*B01J 20/30* (2006.01)
*C02F 1/28* (2006.01)
*B01J 20/34* (2006.01)
*C08G 77/442* (2006.01)
*C02F 101/30* (2006.01)

(52) U.S. Cl.
CPC ........... *B01J 20/3425* (2013.01); *C02F 1/285* (2013.01); *C08G 77/442* (2013.01); *B01D 2253/202* (2013.01); *B01D 2257/556* (2013.01); *B01D 2259/40088* (2013.01); *C02F 2101/30* (2013.01); *C02F 2303/16* (2013.01)

(56) References Cited

U.S. PATENT DOCUMENTS

| | | | |
|---|---|---|---|
| 4,585,836 | A | 4/1986 | Homan et al. |
| 4,591,622 | A | 5/1986 | Blizzard et al. |
| 4,851,216 | A | 7/1989 | Lee |
| 5,093,451 | A | 3/1992 | Panster et al. |
| 5,149,425 | A * | 9/1992 | Mazid .................. B01J 20/3219 502/402 |
| 5,599,445 | A | 2/1997 | Betz et al. |
| 5,922,108 | A | 7/1999 | Lehmann et al. |
| 6,706,831 | B2 | 3/2004 | Sonnenschein et al. |
| 7,524,907 | B2 | 4/2009 | Jialanella et al. |
| 7,683,132 | B2 | 3/2010 | Jialanella et al. |
| 8,097,689 | B2 | 1/2012 | Ahn et al. |
| 9,080,000 | B2 | 7/2015 | Ahn et al. |
| 9,512,276 | B2 | 12/2016 | Sugiura et al. |
| 9,731,245 | B2 | 8/2017 | Ahn et al. |
| 9,962,657 | B2 | 5/2018 | Ahn et al. |
| 2003/0159996 | A1 | 8/2003 | Ernst et al. |
| 2011/0052462 | A1 | 3/2011 | Schmidt et al. |
| 2013/0017141 | A1 | 1/2013 | Cote et al. |
| 2014/0135212 | A1* | 5/2014 | Edmiston ................ C08L 83/06 502/402 |
| 2016/0168172 | A1* | 6/2016 | Li .......................... B01D 15/00 502/158 |
| 2019/0076820 | A1 | 3/2019 | Ahn et al. |

FOREIGN PATENT DOCUMENTS

| | | |
|---|---|---|
| JP | 2005118661 | 5/2005 |
| JP | 2011183382 | 9/2011 |
| JP | 2011212565 | 10/2011 |
| RU | 2324175 | 5/2008 |
| WO | 1995007967 | 3/1995 |
| WO | 2009091367 | 7/2009 |
| WO | WO-2009091367 A1 * | 7/2009 ............. B01D 53/72 |

OTHER PUBLICATIONS

Funge, et. al. "Siloxanvernetztes Polyvinylacetate als Adsorbens fur Phenole" Journal fuer Praktische Chemie, vol. 312, Issue 4. 1970. pp. 734-736.

Samodumova, et. al. "Use of Organosilicon adsorbents for the collection of gasoline vapors" Khimicheskaya Tekhnologiya (Kiev), Issue 6. 1979. pp. 44-46.

* cited by examiner

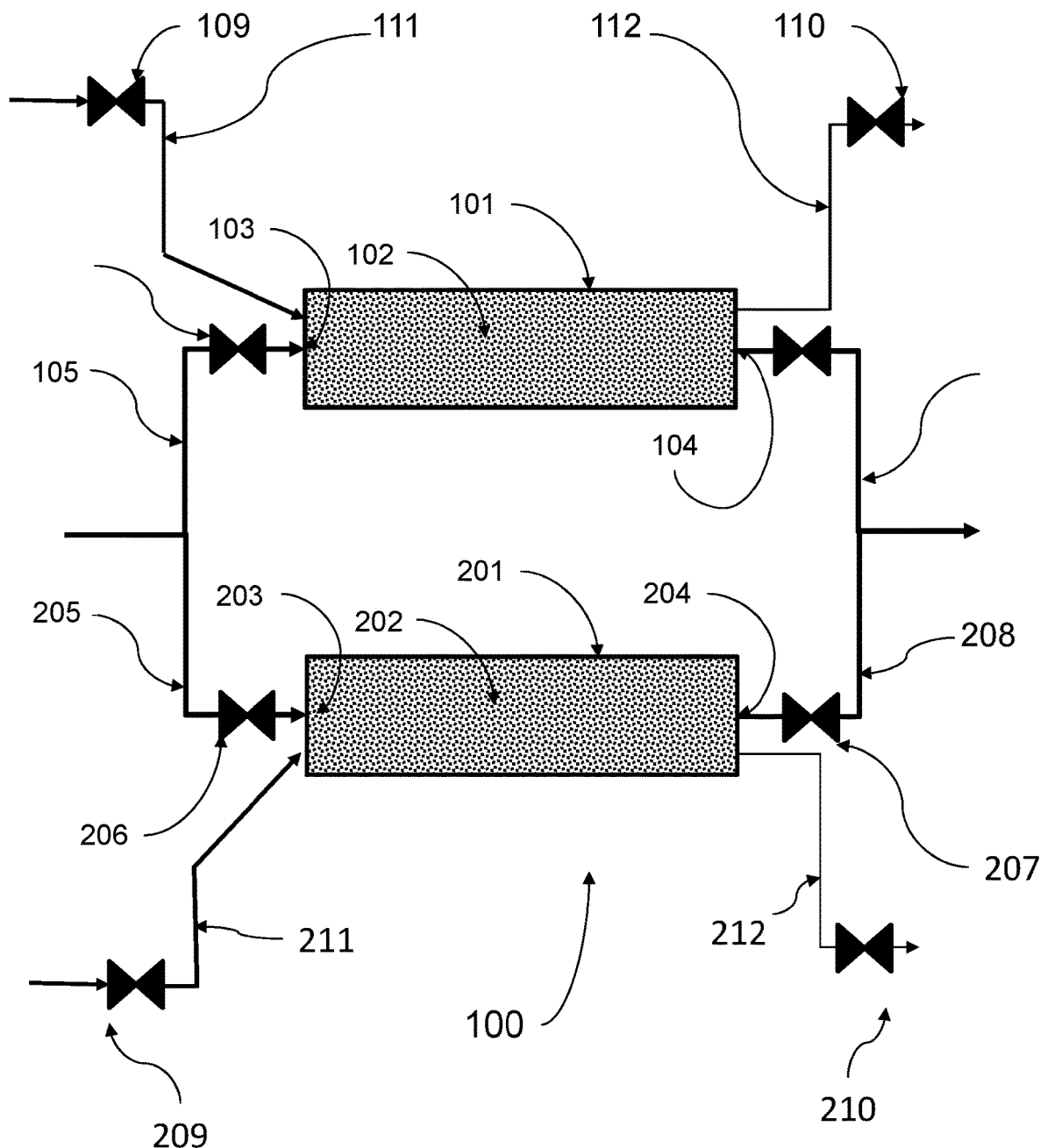
FIGURE

METHOD OF DEPLETING AN ORGANOSILICON COMPONENT IN A MIXTURE USING A SORBENT COPOLYMER AND APPARATUS FOR PRACTICING THE METHOD

CROSS REFERENCE TO RELATED APPLICATIONS

This application is a U.S. national stage filing under 35 U.S.C. § 371 of PCT Application No. PCT/US18/020134 filed on 20 Sep. 2018, currently pending, which claims the benefit of U.S. Provisional Patent Application No. 62/470,904 filed 14 Mar. 2017 under 35 U.S.C. § 119 (e). PCT Application No. PCT/US18/020134 and U.S. Provisional Patent Application No. 62/470,904 are hereby incorporated by reference.

TECHNICAL FIELD

A method for depleting an organosilicon component in a mixture comprises sorbing at least some of the organosilicon component by a copolymer of a di-alkenyl functional aromatic hydrocarbon and a polyorganosiloxane. The copolymer may be a divinylbenzene/polydimethylsiloxane copolymer. An apparatus for practicing the method is also disclosed.

BACKGROUND

Reduction of organosilicon species such as volatile polydiorganosiloxanes (e.g., cyclic polydialkylsiloxanes and/or linear polydialkylsiloxane oligomers) is often a cost-prohibitive step in chemical manufacturing, as well as in the treatment of effluent process gas or wastewater streams. Porous solid adsorbents such as activated carbon or molecular sieves have been used for such purposes. However because such solid adsorbents rely upon adsorption into pores, they may suffer from the drawbacks of being subject to mass transfer limitations, requiring significant energy input for regeneration by desorption, and/or being prone to fouling and capillary condensation.

Silicone liquids have also been used for organosilicon species removal because they may be more readily regenerated, feature faster dynamics, and/or are less prone to fouling than porous solid adsorbents. However, existing methods using silicone liquids in which the feed mixture to be treated is directly contacted with the silicone liquid may require additional liquid separation steps if any of the silicone liquid is entrained or carried over into the feed mixture or vice versa. To avoid such problems, methods employing membrane separators have been used. However, membrane separators suffer from the drawbacks that they may add equipment cost and be prone to fouling.

Problem to be Solved

There is an industry need for methods to remove organosilicon species from products, effluent process gas and/or wastewater streams, where such the sorbents used in such methods and apparatus can be readily regenerated, are less prone to fouling, and/or have fewer mass transfer limitations than existing methods and apparatus.

BRIEF SUMMARY OF THE INVENTION

A method for depleting an organosilicon component in a mixture comprises sorbing at least some of the organosilicon component by a copolymer of a di-alkenyl functional aromatic hydrocarbon and a polyorganosiloxane, thereby enriching the copolymer in the organosilicon component and depleting the mixture in the organosilicon component.

BRIEF DESCRIPTION OF THE DRAWING

The FIG. 1 is an example of an apparatus that can be used for practicing the method described herein.

DETAILED DESCRIPTION OF THE INVENTION

A method for depleting an organosilicon component in a mixture comprising the organosilicon component and at least one other component (which is distinct from the organosilicon component) forms a depleted mixture, which contains less of the organosilicon component than the mixture before practicing the method. The method comprises:

1) sorbing at least some of the organosilicon component by a copolymer of a di-alkenyl functional aromatic hydrocarbon and a polyorganosiloxane, thereby forming the depleted mixture and enriching the copolymer with sorbed organosilicon component, thereby forming an enriched copolymer, 2) desorbing at least some of the organosilicon component from the enriched copolymer, thereby forming a desorbed organosilicon component and a regenerated copolymer, and 3) using the regenerated copolymer as all or a portion of the copolymer in repeating step 1). The method may optionally further comprise: directing (e.g., to a desired location) one or both of the depleted mixture after step 1) and/or the desorbed organosilicon component after step 2).

In step 1) of the method, method conditions (such as pressure and temperature) may be such that at least some of the organosilicon component is in the gas phase. The conditions may be such that the mixture is heated. The temperature for heating may be above the boiling point of the organosilicon component. Alternatively, the temperature may be selected such that all of the organosilicon component is in the gas phase. Alternatively, the method may further comprise vaporizing the mixture before step 1). The mixture may be vaporized by any convenient means such as heating e.g., above the boiling temperature of the mixture. Without wishing to be bound by theory, it is thought that as long as the partial pressure of the organosilicon component in the mixture exceeds the partial pressure of the organosilicon component in the copolymer or on the copolymer surface, there will be a sufficient driving force for mass transfer of the organosilicon component into the bulk of the copolymer and/or onto the surface of the copolymer.

The mixture may be contacted with the copolymer for an amount of time sufficient to allow the copolymer to sorb at least some of the organosilicon component from the mixture. The mixture may be contacted directly with the copolymer in step 1), i.e., without the use of a membrane. The mixture may be a liquid. Alternatively, the mixture may be in the gas phase during step 1). The organosilicon compound may be adsorbed on the surface of the copolymer, absorbed into the bulk of the copolymer, or both.

Step 2) of the method may be performed to regenerate the copolymer. As the copolymer sorbs the organosilicon component, sorption rate may decrease and/or the copolymer may swell. It is desirable to desorb at least some of the organosilicon component from the copolymer so that the copolymer can be regenerated and reused. During and/or after step 2), the organosilicon component may optionally be recovered. Regenerating the copolymer may be performed by stopping step 1) of the method and regenerating the copolymer, then repeating step 1) after step 2). Alternatively, the mixture may be re-routed to continue step 1) while performing step 2) on the enriched copolymer. An example of this method is shown below in the FIGURE.

Regenerating the enriched copolymer may be performed by any convenient means, such as heating, optionally with sweeping by a dry air gas stream or inert gas stream in contact with the enriched copolymer. It is also possible to desorb at lower temperature (e.g., room temperature of 25° C. or less) by exposing the enriched copolymer to a reduced pressure (e.g., less than atmospheric pressure), and/or contacting the enriched copolymer with an organosilicon component depleted sweep stream. Alternatively, exposing the enriched copolymer to solvent with or without swelling the enriched copolymer may also be used to regenerate the enriched copolymer. Alternatively, liquid extraction, e.g., solvent or supercritical fluid extraction may be used to regenerate the enriched copolymer. The method further comprises step 3), in which the regenerated copolymer may be reused to repeat step 1). The copolymer used in repeating step 1) may be all regenerated copolymer, alternatively, a portion of the copolymer used to repeat step 1) may be regenerated copolymer, with the balance being fresh copolymer.

The method further comprises directing to a desired location one or both of i) the depleted mixture during and/or after step 1) and ii) the desorbed organosilicon component during and/or after step 2). Directing may be performed by any convenient means such as feeding the depleted mixture through a channel such as a pipe, duct, or other conduit to the desired location, such as a recovery operation. The recovery operation may include cooling apparatus, such as a heat exchanger or condenser. The recovery operation may include a collection apparatus such as a tank, reservoir, or other container, for storing the depleted mixture and/or a tank for storing the organosilicon component. Alternatively, the depleted mixture may be directed to a different operation, such as when the depleted mixture will be used as a reactant. Alternatively, the organosilicon component may be directed to a different operation, such as when the organosilicon component will be used as a reactant. Alternatively, one or both of the depleted mixture and the organosilicon component may be directed to collection containers.

For example, when the method is being used to purify the mixture of the organosilicon component; the depleted mixture is a purified mixture that may be recovered and/or directed by any convenient means, such as feeding the depleted mixture through a channel such as a pipe, duct, or other conduit to a heat exchanger or condenser and cooling therein, when the mixture was heated and/or in the gas phase in step 1).

Alternatively, recovering the purified mixture may comprise feeding the purified mixture from the condenser (described above) to a different reactor where the purified mixture is used as a reactant or solvent. In one embodiment, the mixture includes a cyclic polyorganosiloxane as the organosilicon component and a polyorganosiloxane (distinct from the cyclic polyorganosiloxane) as at least one other component in the mixture. Using the method described herein on this mixture can produce a purified mixture comprising the polyorganosiloxane (free of the cyclic polyorganosiloxane). This purified mixture may be directed to a collection container to be tested, packaged and/or sold, or the purified mixture may be directed to a different process and used as a reactant or other ingredient in making a polyorganosiloxane containing product.

Alternatively, when the mixture is waste water and the depleted mixture is purified water, the purified water may be directed by feeding (e.g., pumping) the purified water to a process to test, or to the environment. Alternatively, when the mixture is air, and the depleted mixture is purified air, the purified air may be directed blowing or pumping via ductwork into an air handling system or a ventilation system. It is understood that conduit through which the one or both of the depleted mixture during and/or after step 1) and the desorbed organosilicon component during and/or after step 2) is directed may also contain in-line monitoring testing equipment, such as gauges, meters and sensors, along with conveying equipment such as pumps, fans, blowers, extruders, compounders, and valves.

The organosilicon component may be recovered by any convenient means. For example, when the enriched copolymer is regenerated by sweeping with a dry gas stream, as described above, the gas stream containing the organosilicon component may be directed through a condenser to recover the organosilicon component. Alternatively, if a solvent is used to regenerate the enriched copolymer, the organosilicon component may be directed to an apparatus for stripping, extracting, or distilling to remove the solvent. Alternatively, directing the organosilicon component may comprise feeding the organosilicon component from the condenser (described above), or the solvent containing the organosilicon component, to a different reactor where the organosilicon component is used as a reactant.

Organosilicon Component

The organosilicon component may be any organosilicon species that is desirably removed from the mixture. In the method described herein, the organosilicon component may have a vapor pressure of 0.1 mmHg at 70° C. to 760 mmHg at 70° C., alternatively 1 mmHg at 70° C. to 100 mmHg at 70° C., alternatively 4 mmHg at 70° C. to 82 mmHg, and alternatively 17 mmHg at 70° C. to 82 mmHg at 70° C. The product formed by step 1) of the method is a depleted mixture, wherein said depleted mixture is free of the organosilicon component, or contains less of the organosilicon component than the mixture before step 1). "Free of" means that the depleted mixture contains none of the organosilicon component or an amount of the organosilicon component that is non-detectable by GC analysis.

The organosilicon component may be a cyclic polyorganosiloxane with a DP from 3 to 12, alternatively the organosilicon component may be a cyclic polydialkylsiloxane with an average DP of 4. The cyclic polyorganosiloxane may be have formula $(R^{11}R^{12}SiO_{2/2})_k$, where subscript k is 3 to 12, each $R^{11}$ is independently a monovalent hydrocarbon group or monovalent halogenated hydrocarbon group, and each $R^{12}$ is independently $R^{11}$, OH, or H. Suitable monovalent hydrocarbon groups include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. An alkenyl group is a monovalent hydrocarbon group containing a double bond. Suitable alkenyl groups for $R^{11}$ are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms. An alkynyl group is a monovalent hydrocarbon group containing a triple bond. Suitable alkynyl groups for $R^{11}$ are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl. Alternatively, the organosilicon component may be a cyclic polydiorganohydrogensiloxane. The organosilicon component may comprise (i) hexamethylcyclotrisiloxane ($D_3$), (ii) octamethylcyclotetrasiloxane ($D_4$), (iii) tetramethylcyclotetrasiloxane ($D_4^H$), (iv) tetramethyltetravinyl cyclotetrasiloxane ($D_4^{Vi}$), (v) tetramethyltetraphenylcyclotetrasiloxane ($D_4^{Ph}$), (vi) decamethylcyclopentasiloxane ($D_5$), (vii) pentamethylcyclopentasiloxane ($D_5^H$), (viii) pentamethylpentavinylcyclopentasiloxane ($D_5^{Vi}$), (ix) pentamethylpentaphenylcyclopentasiloxane ($D_5^{Ph}$), (x) dodecamethylcyclohexasiloxane ($D_6$), (xi) hexamethylcyclohexasiloxane ($D_6^H$), (xii) hexamethylhexavinylcyclohexasiloxane ($D_6^{Vi}$), (xiii) hexamethylhexaphenylcyclohexasiloxane ($D_6^{Ph}$), (xiv) dimethyl/methylvinyl cyclic siloxanes with 3 to 6 silicon atoms, (xv) dimethyl/methyl hydrogen cyclic siloxanes with 3 to 6 silicon atoms, or (xvi) combinations of two or more of (i), (ii), (iii), (iv), (v), (vi), (vii), (viii), (ix), (x), (xi), (xii), (xiii), (xiv), and (xv). Alternatively, the organosilicon component may be selected from $D_3$, $D_4$, $D_5$, $D_6$, and combinations of two or more of $D_3$, $D_4$, $D_5$, and $D_6$. Alternatively, the organosilicon component may be $D_4$.

Alternatively, the organosilicon component may be an organosilane or polyorganosiloxane with a DP of 1 to 14. The organosilane may have formula: $R^1{}_v SiR^2{}_{(4-v)}$, where each $R^1$ is independently a monovalent hydrocarbon group or a monovalent halogenated hydrocarbon group, each $R^2$ is independently a hydrogen atom, a halogen atom, a hydrocarbonoxy group such as alkoxy, an amino functional group, an acyloxy group such as acetoxy, an epoxy-functional group, a methacrylate functional group, an oximo functional group such as ketoxime, an acrylate functional group, a polyol functional group such as polyether, a thiol functional group; and subscript v is 0 to 4, alternatively 0 to 3.

Suitable monovalent hydrocarbon groups for $R^1$ include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. An alkenyl group is a monovalent hydrocarbon group containing a double bond. Suitable alkenyl groups for $R^1$ are exemplified by, but not limited to, ethenyl, propenyl (e.g., iso-propenyl and/or n-propenyl), butenyl (e.g., isobutenyl, n-butenyl, tert-butenyl, and/or sec-butenyl), pentenyl (e.g., isopentenyl, n-pentenyl, and/or tert-pentenyl), hexenyl, heptenyl, octenyl, nonenyl, and decenyl, as well as such branched groups of 6 or more carbon atoms. An alkynyl group is a monovalent hydrocarbon group containing a triple bond. Suitable alkynyl groups for $R^1$ are exemplified by, but not limited to, ethynyl, propynyl (e.g., iso-propynyl and/or n-propynyl), butynyl (e.g., isobutynyl, n-butynyl, tert-butynyl, and/or sec-butynyl), pentynyl (e.g., isopentynyl, n-pentynyl, and/or tert-pentynyl), hexynyl, heptynyl, octynyl, nonynyl, and decynyl, as well as such branched groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

Suitable halogen atoms for $R^2$ include F, Cl, Br, or I; alternatively F, Cl, or Br; alternatively Cl or Br; alternatively Cl; alternatively Br. Suitable hydrocarbonoxy groups for $R^2$ have formula $OR^3$, where $R^3$ is a monovalent hydrocarbon group as defined above for $R^1$. Subscript v is 1 to 4, alternatively 1 to 3, and alternatively 1 to 2. Exemplary organosilanes include trimethylsilane, vinyltrimethylsilane, allyltrimethylsilane, dimethyldimethoxysilane, and/or methyltrimethoxysilane.

Alternatively, the organosilicon compound to be removed from the mixture using the method described above may be a volatile polyorganosiloxane. The volatile polyorganosiloxane may be linear or branched. Examples include polydimethylsiloxane oligomers and polymers. The volatile polyorganosiloxane may have unit formula $(R^4_3SiO_{1/2})_w(R^4_2SiO_{2/2})_x(R^4SiO_{3/2})_y(SiO_{4/2})_z$, where $R^4$ is a hydrogen atom, OH, or $R^1$ as described above, subscript w is >0, subscript x≥0, subscript y is ≥0, subscript z is ≥0, with the proviso that a quantity (w+x+y+z) is ≥14. Alternatively, y may be 0. Alternatively, z may be 0. Alternatively, w may be 2 and x may be 0 to 12, alternatively 0 to 2. Exemplary volatile polyorganosiloxanes may include those of formulae: $(R^4_3SiO_{1/2})_2(R^4_2SiO_{2/2})_2$, $(R^4_3SiO_{1/2})_2(R^4_2SiO_{2/2})_1$, $(R^4_3SiO_{1/2})_2$, and/or $(R^4_3SiO_{1/2})_4(SiO_{4/2})_1$. Alternatively, each $R^4$ may be independently a hydrogen atom, a methyl group, a vinyl group, or a phenyl group. Alternatively, each $R^4$ may be methyl. Such volatile polyorganosiloxanes include hexamethyldisiloxane, octamethyltrisiloxane, hexamethylcyclotrisiloxane, and other low molecular weight polyorganosiloxanes, such as 0.5 to 1.5 cSt Dow Corning® 200 Fluids and Dow Corning® OS FLUIDS, which are commercially available from Dow Corning Corporation of Midland, Mich., U.S.A. Alternatively, the organosilicon compound to be removed from the mixture may be a neopentamer, of formula $Si(OSiR^4_3)_4$, where $R^4$ is as described above. Exemplary neopentamers include $Si[OSi(CH_3)_3]_4$, $Si[OSi(CH_3)_2H]_4$, and $Si[OSi(CH_3)_2Vi]_4$.

The mixture used in step 1) of the method described above may be any mixture from which it is desirable to remove some or all of the organosilicon component as described above. The mixture comprises the organosilicon component and at least one other component. The organosilicon component may have a vapor pressure less than a vapor pressure of the at least one other component in the mixture. In certain embodiments, the organosilicon component may be distinguished from the at least one other component in the mixture by virtue of relative vapor pressures or differences in solubility of the organosilicon component, and solubility of the at least one other component, in the copolymer. For example, in one embodiment, a species such as a linear polydimethylsiloxane may be an organosilicon component when the at least one other component in the mixture has a lower vapor pressure than the linear polydimethylsiloxane. Alternatively, the same linear polydimethylsiloxane may be the at least one other component in the mixture when the organosilicon component is, for example, an organosiloxane resin having a vapor pressure higher than the vapor pressure of the linear polydimethylsiloxane. Without wishing to be bound by theory, it is thought that the difference in vapor pressure (where the organosilicon component has a higher vapor pressure than the at least one other component in the mixture) or differences in solubility of the organosilicon component, and solubility of the at least one other component in the mixture, in the copolymer allow the organosilicon component in vapor phase to be preferentially removed from the mixture and be sorbed by the copolymer.

The at least one other component may be a relatively non-volatile polyorganosiloxane (e.g., less volatile than the polyorganosiloxane described above for the organosilicon component). The non-volatile polyorganosiloxane may have unit formula: $(R^4_3SiO_{1/2})_p(R^4_2SiD_{2/2})_q(R^4SiO_{3/2})_r(SiO_{4/2})_s$, where $R^4$ is as described above, D is an oxygen atom or a divalent hydrocarbon group, subscript p>0, subscript q is >0, subscript r is ≥0, subscript s is ≥0, with the proviso that a quantity (p+q+r+s)>14. Each D is an oxygen atom or a divalent group linking the silicon atom of one unit with another silicon atom in another unit. When D is the divalent linking group, D may be independently selected from divalent hydrocarbon groups containing 2 to 30 carbon atoms, divalent acrylate functional hydrocarbon groups containing 2 to 30 carbon atoms, and/or divalent methacrylate functional hydrocarbon groups containing 2 to 30 carbon atoms. Representative, non-limiting examples of suitable divalent hydrocarbon groups include alkylene groups such as ethylene, propylene (including isopropylene and n-propylene), and butylene (including n-butylene, t-butylene and isobutylene); and pentylene, hexylene, heptylene, octylene, and branched and linear isomers thereof; arylene groups such as phenylene; and alkylaralkylene groups such as:

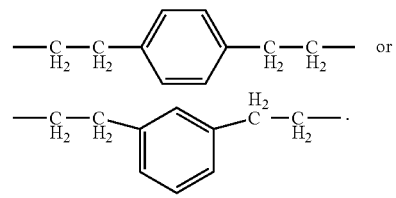

Representative, non-limiting examples of such divalent organofunctional hydrocarbon groups include divalent bisphenol A derivatives, acrylate-functional alkylene groups and methacrylate-functional alkylene groups. Alternatively, each group D may be ethylene, propylene, butylene or hexylene. Alternatively, each instance of group D may be ethylene or propylene. Non-volatile polyorganosiloxanes are known in the art and are commercially available. Suitable non-volatile polyorganosiloxanes are exemplified by, but not limited to, non-volatile polydimethylsiloxanes. Such non-volatile polydimethylsiloxanes include DOW CORNING® 200 Fluids, which are commercially available from Dow Corning Corporation of Midland, Mich., U.S.A. and may have viscosity ranging from 10 cSt to 100,000 cSt, alternatively 20 cSt to 50,000 cSt, alternatively 50 cSt to 100,000 cSt, alternatively 50 cSt to 50,000 cSt, and alternatively 12,500 to 60,000 cSt. When the method described herein is used to remove a volatile polyorganosiloxane from a non-volatile polyorganosiloxane, then the volatile polyorganosiloxane has a vapor pressure lower than vapor pressure of the non-volatile polyorganosiloxane at the same temperature. The non-volatile polyorganosiloxane and the volatile polyorganosiloxane will differ from one another in at least one property such as molecular weight, degree of polymerization, and selections for $R^4$ groups.

The non-volatile polyorganosiloxane may be a noncyclic polyorganosiloxane polymer and/or copolymer. The method may be used to purify polyorganosiloxane intermediates and products such as linear and/or branched polydiorganosiloxane polymers and/or copolymers. In certain applications, low or non-detectable (by GC) content of cyclic polydialkylsiloxanes is desired by customers, particularly in the beauty and healthcare industries. Examples of such polydiorganosiloxane polymers and copolymers may have formulae (I) or (II), below:

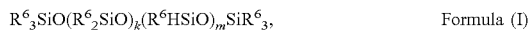

$R^6_3SiO(R^6_2SiO)_k(R^6HSiO)_mSiR^6_3$,      Formula (I)

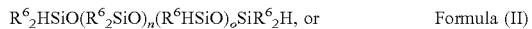

$R^6_2HSiO(R^6_2SiO)_n(R^6HSiO)_oSiR^6_2H$, or      Formula (II)

a combination thereof.

In formulae (I) and (II) above, subscript k has an average value ranging from 1 to 2000, subscript m has an average value ranging from 0 to 2000, subscript n has an average value ranging from 1 to 2000, and subscript o has an average value ranging from 0 to 2000. Each $R^6$ is independently a monovalent organic group. The monovalent organic group may be a monovalent hydrocarbon group or a monovalent halogenated hydrocarbon group. Monovalent hydrocarbon groups include alkyl, alkenyl, alkynyl, aryl, aralkyl, and carbocyclic groups. Alkyl groups include branched or unbranched, saturated monovalent hydrocarbon groups, which are exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, as well as branched saturated monovalent hydrocarbon groups of 6 or more carbon atoms. Aryl groups include cyclic, fully unsaturated, hydrocarbon groups exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Aralkyl group means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Carbocyclic groups are hydrocarbon rings. Carbocyclic groups may be monocyclic or alternatively may have fused, bridged, or spiro polycyclic rings. Monocyclic carbocyclic groups may have 3 to 9 carbon atoms, alternatively 4 to 7 carbon atoms, and alternatively 5 to 6 carbon atoms. Polycyclic carbocyclic groups may have 7 to 17 carbon atoms, alternatively 7 to 14 carbon atoms, and alternatively 9 to 10 carbon atoms. Carbocycles may be saturated or partially unsaturated. The carbocyclic group may be a cycloalkyl group, which is saturated. Suitable monocyclic cycloalkyl groups are exemplified by cyclobutyl, cyclopentyl, and cyclohexyl. Suitable monovalent halogenated hydrocarbon groups refer to a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include chloroallyl.

Alternatively, the monovalent organic group may be a hydrocarbon group substituted with an oxygen-atom, such as, alkoxy groups, aryloxy groups, aralkyloxy groups, oxo (carbonyl) groups, carboxyl groups including carboxylic acids, carboxylates, and carboxylate esters. Alternatively, the monovalent organic group may be a hydrocarbon group substituted with a sulfur atom, such as thiol-functional groups, alkyl and aryl sulfide groups, sulfoxide-functional groups, sulfone functional groups, sulfonyl functional groups, and sulfonamide functional groups. Alternatively, the monovalent organic group may be a hydrocarbon group substituted with a nitrogen atom such as amines, hydroxylamines, nitriles, nitro groups, N-oxides, hydrazides, azides, and enamines. Alternatively, the monovalent organic group may be a hydrocarbon group substituted with another heteroatom-containing groups. Non-limiting examples of atoms and groups substituted on a monovalent hydrocarbon group to form the monovalent organic groups include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl, or R' can be independently mono- or multi-substituted; or wherein two R' groups bonded to a nitrogen atom or to adjacent nitrogen atoms can together with the nitrogen atom or atoms form a heterocyclyl, which can be mono- or independently multi-substituted. Examples of organic groups include linear and/or branched groups such as alkyl groups, fully or partially halogen-substituted haloalkyl groups, alkenyl groups, alkynyl groups, aromatic groups, acrylate functional groups, and methacrylate functional groups; and other organic functional groups such as ether groups, cyanate ester groups, ester groups, carboxylate salt groups, mercapto groups, sulfide groups, azide groups, phosphonate groups, phosphine groups, masked isocyano groups, and hydroxyl groups. Examples of organic groups include, but are not limited to, alkyl groups such as methyl, ethyl, propyl, isopropyl, n-butyl, s-butyl, and t-butyl groups, acrylate functional groups such as acryloyloxypropyl groups and methacryloyloxypropyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; alkyloxypoly(oxyalkylene) groups such as propyloxy(polyoxyethylene), propyloxypoly(oxypropylene), and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as acetoxyethyl and benzoyloxypropyl groups; hydroxy functional groups such as hydroxyethyl and 2-hydroxyethyl groups; masked isocyanate functional groups such as propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; and metal salts of carboxylic acids such as the zinc, sodium, or potassium salts of 3-carboxypropyl and 2-carboxyethyl.

The term "substituted" as used herein refers to a monovalent hydrocarbon group as defined herein in which one or more bonds to a hydrogen atom contained therein are replaced by one or more bonds to a non-hydrogen atom and/or one or more carbon atoms are replaced with a heteroatom (e.g., halogen, N, O, or S).

Polyorganosiloxanes in the mixture to be purified are exemplified by:
a) trimethylsiloxy-terminated polydimethylsiloxane,
b) trimethylsiloxy-terminated poly(dimethylsiloxane/methylphenylsiloxane),
c) dimethylhydrogensiloxy-terminated polydimethylsiloxane,
d) dimethylhydrogensiloxy-terminated poly(dimethylsiloxane/methylhydrogensiloxane),
e) dimethylhydrogensiloxy-terminated polymethylhydrogensiloxane,
f) trimethylsiloxy-terminated poly(dimethylsiloxane/methylhydrogensiloxane),
g) trimethylsiloxy-terminated polymethylhydrogensiloxane, hydroxy-terminated polydimethylsiloxane, hydroxy-terminated poly(dimethylsiloxane/methylvinylsiloxane), hydroxy-terminated poly(dimethylsiloxane/methylphenylsiloxane),
h) a combination of two or more of a), b), c), d), e), f), and g).

Alternatively, the non-volatile polyorganosiloxane in the mixture to be purified may comprise a polyorganosiloxane resin, such as an MQ resin, an MT resin, a DT resin, an MTQ resin, an MDT resin, and/or a silsesquioxane resin. An MQ resin may consist essentially of $R^6_3SiO_{1/2}$ units and $SiO_{4/2}$ units; a TD resin may consist essentially of $R^6SiO_{3/2}$ units and $R^6_2SiO_{2/2}$ units; an MT resin may consist essentially of $R^6_3SiO_{1/2}$ units and $R^6SiO_{3/2}$ units; an MTQ resin may consist essentially of $R^6_3SiO_{1/2}$ units, $R^6SiO_{3/2}$ units, and $SiO_{4/2}$ units; and an MTD resin may consist essentially of $R^6_3SiO_{1/2}$ units, $R^6SiO_{3/2}$ units, and $R^6_2SiO_{2/2}$ units; a silsesquioxane resin may consist essentially of $R^6SiO_{3/2}$ units; or a combination of two or more of MQ, MT, DT, MTQ, MDT, and silsesquioxane resins; where $R^6$ is as described above.

The resin may contain an average of 3 to 30 mole percent of functional substituents, such as hydrogen atoms, or groups such as hydroxyl, hydrolyzable, or aliphatically unsaturated organic groups. The aliphatically unsaturated organic groups may be alkenyl groups, alkynyl groups, or a combination thereof. The mole percent of functional substituents in the resin is the ratio of the number of moles of functional substituent-containing siloxane units in the resin to the total number of moles of siloxane units in the resin, multiplied by 100.

Methods of preparing resins are well known in the art. For example, resin may be prepared by the silica hydrosol capping process of Daudt, et al. and optionally by treated with an endblocking reagent. The method of Daudt et al., is disclosed in U.S. Pat. No. 2,676,182. Briefly stated, the method of Daudt, et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting resins generally contain from 2 to 5 percent by weight of hydroxyl groups.

The resin, which may contain less than 2% of silicon-bonded hydroxyl groups, may be prepared by reacting the product of Daudt, et al. with a functional substituent-containing endblocking agent and/or an endblocking agent free of functional substituents, in an amount sufficient to provide from 3 to 30 mole percent of functional substituents in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare the resin.

Alternatively, the mixture may be a process gas or vapor stream. Examples include mixed overhead vapor streams from reactors, such as those used to polymerize or functionalize polyorganosiloxanes, as well as air streams and exhaust streams containing residual volatile siloxanes such as landfill gas. Examples of types of reactions include hydrolysis, condensation, hydrosilylation, epoxidation, alkoxylation, trans-esterification, trans-alcoholysis, radical polymerization, anionic or cationic polymerization. Other examples of process gas streams include combustion exhaust from power plants, engines, heaters and furnaces.

Alternatively, the mixture may be a process liquid stream. Examples include wastewater or an emulsion such as a silicone emulsion containing residual volatile siloxanes.

Applications/Use of the Method

The method described herein may be used to reduce the amount of cyclic polydiorganosiloxanes (as described above), e.g., cyclic polydialkylsiloxanes in mixtures such as non-volatile polyorganosiloxanes (as described above), non-cyclic polydiorganosiloxanes, process gas effluent, and/or process wastewater. In some embodiments, the method described herein may be use to selectively remove a organosilicon component, while leaving behind a desired organosilicon component in the depleted mixture. In this embodiment, the solubility of one organosilicon component in the copolymer may be higher than solubility of a second organosilicon component having a higher vapor pressure. For example, in the case of a silicone emulsion, which contains water vapor and cyclic polyorganosiloxanes, such as $D_4$ and $D_5$, it may be desirable to remove the cyclic polyorganosiloxanes and leave non-volatile polyorganosiloxanes in the emulsion.

In one embodiment, the method described herein may be used to remove an organosilicon component from a mixture comprising the organosilicon component and at least one other component. This method comprises:

1) contacting a vapor phase mixture directly with a copolymer of a di-alkenyl functional aromatic hydrocarbon and a polyorganosiloxane, wherein the copolymer has a glass transition temperature≤25° C., thereby forming a depleted mixture containing less of the organosilicon component than the mixture before sorbing and enriching the copolymer with sorbed organosilicon component, thereby forming an enriched copolymer, 2) recovering the depleted mixture during and/or after step 1), 3) desorbing at least some of the sorbed organosilicon component from the enriched copolymer, thereby forming a desorbed organosilicon component and a regenerated copolymer containing less of the sorbed organosilicon component than the enriched copolymer before desorbing, 4) using the regenerated copolymer as all or a portion of the copolymer in repeating step 1), and optionally 5) recovering the desorbed organosilicon component during and/or after step 2). In this embodiment, the organosilicon component may be a volatile contaminant. The volatile contaminant may comprise a cyclic polyorganosiloxane with a degree of polymerization from 3 to 12 as described above. The at least one other component in the mixture may comprise a linear polyorganosiloxane. The copolymer may be an addition reaction product of divinyl benzene and an addition reaction polymerizable polyorganosiloxane. This embodiment of the method may be used to remove $D_4$ from various mixtures, including but not limited to linear polyorganosiloxanes.

Copolymer

The copolymer useful in the method described above is an addition reaction product of a di-alkenyl functional aromatic hydrocarbon and a polyorganosiloxane. The copolymer may be prepared by a method comprising radical polymerization. For example, the copolymer useful in the method described above may be prepared by a method comprising:
1) free-radical polymerization of starting materials comprising:
  a) an aqueous phase comprising
  i) water,
  optionally ii) a nonionic surfactant,
  iii) a salt; and
  b) an organic phase comprising
  i) a hydrocarbon solvent,
  ii) a polyorganosiloxane having at least one silicon bonded aliphatically unsaturated hydrocarbon group per molecule,
  iii) an initiator, and
  iv) a di-alkenyl aromatic hydrocarbon monomer, and
    optionally v) a mono-alkenyl aromatic monomer; and
2) thereafter removing the solvent.

In the method described above, the water may be deionized water or distilled water. The aqueous phase may contain 50 to 99.9999 parts water per 100 parts of aqueous phase by weight.

Some suitable nonionic surfactants which can be used include polyoxyethylene alkyl ethers, polyoxyethylene alkyl phenyl ethers, alkylglucosides, polyoxyethylene fatty acid esters, sorbitan fatty acid esters, polyoxyethylene sorbitan fatty acid esters, and fatty alcohols, such as cetyl alcohol, stearyl alcohol, cetostearyl alcohol, oleyl alcohol, and polyvinyl alcohol. Nonionic surfactants which are commercially available include compositions such as (i) 2,6,8-trimethyl-4-nonyl polyoxyethylene ether sold under the names Tergitol TMN-6 and Tergitol TMN-10; (ii) the C11-15 secondary alkyl polyoxyethylene ethers sold under the names Tergitol 15-S-7, Tergitol 15-S-9, Tergitol 15-S-15, Tergitol 15-S-30, and Tergitol 15-S-40, by the Dow Chemical Company, Midland, Mich.; octylphenyl polyoxyethylene (40) ether sold under the name Triton X405 by the Dow Chemical Company, Midland, Mich.; (iii) nonylphenyl polyoxyethylene (10) ether sold under the name Makon 10 by the Stepan Company, Northfield, Ill.; (iv) ethoxylated alcohols sold under the name Trycol 5953 by Henkel Corp./Emery Group, Cincinnati, Ohio; (v) ethoxylated alcohols sold under the name Brij L23 and Brij L4 by Croda Inc. Edison, N.J., (vi) alkyl-oxo alcohol polyglycol ethers such as ®GENAPOL UD 050, and Genapol UD110, (vii) alkyl polyethylene glycol ether based on C10-Guerbet alcohol and ethylene oxide such as LUTENSOL® XP 79. Suitable nonionic surfactants also include poly(oxyethylene)-poly(oxypropylene)-poly(oxyethylene) tri-block copolymers. Poly(oxyethylene)-poly(oxypropylene)-poly(oxyethylene) tri-block copolymers are also commonly known as Poloxamers. They are nonionic triblock copolymers composed of a central hydrophobic chain of polyoxypropylene (poly(propylene oxide)) flanked by two hydrophilic chains of polyoxyethylene (poly(ethylene oxide)). Poly(oxyethylene)-poly(oxypropylene)-poly(oxyethylene) tri-block copolymers are commercially available from BASF (Florham Park, N.J.) and are sold under the tradename PLURONIC®, such as Pluronic L61, L62, L64, L81, P84. The nonionic surfactant may also be a silicone polyether (SPE). The silicone polyether as an emulsifier may have a rake type structure wherein the polyoxyethylene or polyoxyethylene-polyoxypropylene copolymeric units are grafted onto the siloxane backbone, or the SPE can have an ABA block copolymeric structure wherein A represents the polyether portion and B the siloxane portion of an ABA structure. Suitable silicone polyethers include Dow Corning® 5329 from Dow Corning Corporation of Midland, Mich. USA. Other useful commercial nonionic surfactants are nonylphenoxy polyethoxy ethanol (10EO) sold under the trademark MAKON® 10 by Stepan Company, Northfield, Ill.; polyoxyethylene 23 lauryl ether (Laureth-23) sold commercially under the trademark BRIJ® 35L by ICI Surfactants, Wilmington, Del.; and RENEX® 30, a polyoxyethylene ether alcohol sold by ICI Surfactants, Wilmington, Del. The aqueous phase may contain 0.0001 to 10 parts nonionic surfactant per 100 parts of aqueous phase by weight.

Suitable salts for use in the method for preparing the copolymer include sodium and potassium halides, such as sodium chloride, sodium bromide, or potassium chloride. The aqueous phase may contain 0.0001 to 20 parts salt per 100 parts of aqueous phase by weight.

Suitable hydrocarbon solvents for use in the method for preparing the copolymer include alkane solvents such as cyclohexane, heptane, octane, decane, and/or dodecane; and aryl solvents such as toluene, xylene, and/or mesitylene. The organic phase may contain 10 to 90 parts hydrocarbon per 100 parts of organic phase by weight.

Suitable polyorganosiloxanes use in the method for preparing the copolymer include mono alkenyl terminated polydiorganosiloxanes, α,ω-alkenyl terminated polydiorganosiloxanes, cyclic poly(alkyl/alkenyl siloxanes) having a degree of polymerization from 3 to 10, α,ω—(meth)acryloxyalkyl terminated polydiorganosiloxanes, and (meth)

acryloxypropyl terminated polydiorganosiloxanes. Examples of suitable polyorganosiloxanes may be selected from the group consisting of: (A) mono vinyl terminated polydimethylsiloxane, (B) α,ω-vinyl terminated polydimethylsiloxane, (C) cyclic poly(methyl/vinyl siloxane) having a degree of polymerization from 3 to 10, (D) α,ω-methacryloxypropyl terminated polydimethylsiloxane, and (E) methacryloxypropyl terminated polydimethylsiloxane. Examples of suitable polyorganosiloxanes include (Ai) a mono vinyl terminated polydimethylsiloxane having an average degree of polymerization of 78, (Bi) a vinyl terminated polydimethylsiloxane having an average degree of polymerization of 5, (Ci) 2,4,6,8-tetramethyl-2,4,6,8-tetravinylcyclotetrasiloxane, (Cii) a mixture of 2,4,6-trimethyl-2,4,6-trivinylcyclotrisiloxane; 2,4,6,8-tetramethyl-2,4,6,8-tetravinylcyclotetrasiloxane; and 2,4,6,8,10-pentamethyl-2,4,6,8,10-pentavinylcyclopentasiloxane; (Ei) a mono methacryloxypropyl terminated polydimethylsiloxane having an average degrees of polymerization from 5 to 65; and (Di) a methacryloxypropyl terminated polydimethylsiloxane having an average degrees of polymerization from 2 to 135. The organic phase may contain 1 to 90 parts polyorganosiloxane per 100 parts of organic phase by weight.

Suitable initiators for use in the method for preparing the copolymer include azo compounds and organic peroxides and organoboron compound capable of forming free radical generating species. Azo compounds are exemplified by azobisisobutyronitrile, 4,4'-azobis(4-cyanovaleric acid), 1,1'-azobis(cyclohexane carbonitrile), 2,2'-azobis(2-methylpropionamide)dihydrochloride, and 2,2'-azobis(2-methylpropionitrile). Organic peroxides are exemplified by benzoyl peroxide; tert-butyl hydroperoxide; tert-butyl peracetate; cumene hydroperoxide; 2,5-di(tert-butylperoxy)-2,5-dimetyl-3-hexyne; dicumyl peroxide; and 2,5-bis(tert-butylperoxy)-2,5-dimethylhexane. Organic peroxides are commercially available under the trade name Luperox®. The organoboron compound capable of forming free radical generating species may be a) an organoborane-organonitrogen compound complex, b) an organoborate containing at least one B—C bond, and c) both a) the organoborane-organonitrogen compound complex and b) the organoborate containing at least one B—C bond. The organoboron compound may be air stable. The organoborane-organonitrogen compound complex may be an organoborane-amine complex, such as those disclosed in U.S. Pat. Nos. 6,706,831 and 8,097,689 at col. 10, line 39-col. 12, line 35. Exemplary organoborates are disclosed, for example, in U.S. Pat. No. 7,524,907 at col. 6, line 50 to col. 10, line 67; U.S. Pat. No. 7,683,132 at col. 3, line 3 to col. 12, line 54. The organic phase may contain 0.0001 to 5, alternatively 0.0001 to 2, parts initiator per 100 parts of organic phase by weight.

Suitable di-alkenyl aromatic hydrocarbon monomers for use in the method for preparing the copolymer include divinyl benzene or diallyl benzene. Alternatively, the di-alkenyl aromatic hydrocarbon monomer may be divinyl benzene. The organic phase may contain 1 to 90 parts di-alkenyl aromatic hydrocarbon monomer per 100 parts of organic phase by weight.

The method may optionally further comprise adding a mono-alkenyl aromatic hydrocarbon monomer. Suitable mono-alkenyl aromatic hydrocarbon monomers for use in the method include styrene, ethylvinylbenzene and methylvinyl benzene. When present, the mono-alkenyl aromatic hydrocarbon monomer may be present in the organic phase in an amount of 1 to 90 parts per 100 parts of organic phase.

Step 1) of the method described above may be performed by mixing and heating the aqueous and organic phases. Mixing may be done by any conventional means such as mechanical agitation in a stirred tank reactor and heating may be performed at reflux temperature of the starting materials selected, e.g., 50° C. to 100° C., alternatively 80° C. In the method for preparing the copolymer described above, step 2) may be performed by any convenient means, such as by heating and/or reducing the partial pressure of the sorbed organosilicon component by, for example, introducing vacuum and/or sweeping an inert gas over the copolymer. For example, step 2) may be performed by heating the copolymer at 50° C. to 150° C., alternatively 80° C., while reducing pressure below 760 mmHg, e.g., to 1 to 10 mmHg for 5 minutes to 10 hours. The method may optionally further comprise filtering the copolymer after step 1) and washing the copolymer after step 1) and/or after step 2) with a hydrocarbon solvent.

Without wishing to be bound by theory, it is thought that glassy organic polymers, which have Tg>+25° C. have less free volume than lower Tg materials, and the free volume allows more sorption into the bulk of the copolymer than a material with a higher Tg. The coolymer used herein may have Tg≤+25° C. The copolymer used herein may have a tan delta >0, alternatively >0 to 2. Tan delta means ratio of elastic loss modulus to elastic storage modulus.

System/Apparatus

The FIGURE is an example of an apparatus 100 that can be used in practicing the method of this invention. A first contactor 101 contains a first packed bed of particles 102 of a copolymer of a di-alkenyl functional aromatic hydrocarbon and a polyorganosiloxane. The first contactor 101 has a first inlet 103 and a first outlet 104. Feed line 105 can be used to feed the mixture described above into the first contactor 101 through inlet valve 106 into the first inlet 103. As the mixture passes through the first contactor 101, the organosilicon component is sorbed into the particles 102. The depleted mixture exits the first contactor 101 through the first outlet 104, through outlet valve 107 and out through outlet line 108. The depleted mixture is a purified product that may be stored in a collection container, not shown.

The apparatus 100 may further comprise a second contactor 201 containing a second packed bed of particles 202 of a copolymer of a di-alkenyl functional aromatic hydrocarbon and a polyorganosiloxane. The particles 202 may be the same as, or different from, the particles 102 in the first contactor 101. The second contactor 201 has a second inlet 203 and a second outlet 204. When desired, such as when the particles 102 in the first packed bed swell as they sorb the organosilicon component causing an undesirable increase in pressure drop through the packed bed, and/or the rate at which the particles 102 can sorb the organosilicon component slows to an undesired rate as the particles sorb more of the organosilicon component, valves 106 and 107 may be shut and feed valve 206 and outlet valve 207 may be opened. This will re-route the mixture to flow through feed line 205 into the second contactor 201 through inlet valve 206 into the second inlet 203. As the mixture passes through the second contactor 201, the organosilicon component is sorbed into the particles 202. The depleted mixture exits the second contactor 201 through the second outlet 204, through outlet valve 207 and out through outlet line 208. The depleted mixture is a purified product that may be stored in the same or different collection container, not shown.

After the mixture stops flowing through the first contactor 101, the particles 102 in the contactor 101 may be regenerated. For example, purge valves 109, 110 can be opened and a sweep gas (such as air or an inert gas) passed through the first contactor 101 through lines 111, 112. The first contactor 101 may optionally be heated, and/or the sweep gas may optionally be heated. After the particles 102 in the first contactor 101 are regenerated, the valves 206, 207 may be closed and the mixture re-routed through the first contactor 101 again. The particles 202 may be regenerated similarly as in the first contactor 101 through valves and lines, not shown. The method may be repeated using the apparatus 100. The particles 202 in the second contactor 201 may be regenerated by opening purge valves 209, 210 can be opened and a sweep gas (such as air or an inert gas) passed through the second contactor 201 through lines 211, 212. The second contactor 201 may optionally be heated, and/or the sweep gas may optionally be heated.

The FIGURE is included to demonstrate the invention to those of ordinary skill in the art. However, those of skill in the art should, in light of the present disclosure, appreciate that many changes can be made in the specific embodiments which are disclosed and still obtain a like or similar result without departing from the spirit and scope of the invention set forth in the claims. For example, the copolymer may have various forms, in addition to or instead of particles 102, 202, for example, said copolymer may be in the form of thin films, coated support materials (e.g., packing, trays, plates, mesh), nanorods, nanospheres, beads, granules, powders, pellets, particulates, and/or fibers (hollow and not hollow). The contactors 101, 201 may be vertically oriented or horizontally oriented as shown. The contactor 101, 201 may be a packed bed, fluidized bed, a tower containing plates, trays or disks coated with the copolymer. Alternatively, the contactor 101, 201 may be a sorbent wheel, such as a desiccant wheel, or other rotating disc or wheel apparatus wherein the copolymer is coated on all or a portion of the surface of the wheel. Alternatively, additional contactors (not shown) may be configured in parallel or in series configuration with the contactors 101, 201. Optionally, when the contactor is a sorbent wheel or disc, the wheel may rotate through a sector or zone in which regeneration occurs, allowing continuous sorption and regeneration in a single device.

EXAMPLES

These examples are intended to illustrate some embodiments of the invention and should not be interpreted as limiting the scope of the invention set forth in the claims.

In example 1, divinylbenzene/polydimethylsiloxane copolymers suitable for use in the method described herein were synthesized by suspension free-radical polymerization involving an aqueous phase consisting of 240 mL deionized water, 1.2 g polyvinyl alcohol (number average molecular weight=13,000-23,000, 87-89% hydrolyzed), and 7.9 g NaCl, and an organic phase consisting of either 10.41 g toluene or 8.21 g heptane, up to 10 g DVB (technical grade, 80%), up to 10 g siloxane material, and 0.132-0.136 g azobisisobutyronitrile (AIBN) initiator. The polydimethylsiloxane was one of (A1) mono vinyl terminated polydimethylsiloxane (average degree of polymerization=78); (B1) vinyl terminated polydimethylsiloxane (average degree of polymerization=5); (C1) 2,4,6,8-tetramethyl-2,4,6,8-tetravinylcyclotetrasiloxane; (C2) a mixture of 2,4,6-trimethyl-2,4,6-trivinylcyclotrisiloxane, 2,4,6,8-tetramethyl-2,4,6,8-tetravinylcyclotetrasiloxane, and 2,4,6,8,10-pentamethyl-2,4,6,8,10-pentavinylcyclopentasiloxane; (E1) mono methacryloxypropyl terminated polydimethylsiloxane (average degrees of polymerization=5; (E2) mono methacryloxypropyl terminated polydimethylsiloxane (average degrees of polymerization=8; (E3) mono methacryloxypropyl terminated polydimethylsiloxane (average degrees of polymerization=63; (D1) methacryloxypropyl terminated polydimethylsiloxane (average degrees of polymerization=2; (D2) methacryloxypropyl terminated polydimethylsiloxane (average degrees of polymerization=10; (D3) methacryloxypropyl terminated polydimethylsiloxane (average degrees of polymerization=131. Specific quantities of DVB and polydimethylsiloxane for each copolymer as well as the solvent used in synthesis are listed below in Table 1.

TABLE 1

Copolymers

| Copolymer | DVB Mass (grams) | Siloxane Identity and Mass (grams) | Solvent |
| --- | --- | --- | --- |
| 1 | 6.398 | 6.143 (A1) | Toluene |
| 2 | 6.398 | 4.914 (B1) | Toluene |
| 3 | 6.855 | 4.537 (C1) | Toluene |
| 4 | 9.140 | 2.016 (C1) | Toluene |
| 5 | 9.140 | 2.016 (C2) | Toluene |
| 6 | 6.855 | 4.541 (C2) | Toluene |
| 7 | 3.885 | 7.721 (C2) | Toluene |
| 8 | 5.484 | 5.897 (E1) | Toluene |
| 9 | 5.484 | 5.897 (E1) | Heptane |
| 10 | 6.032 | 5.212 (E2) | Toluene |
| 11 | 6.032 | 5.212 (E2) | Heptane |
| 12 | 6.992 | 4.268 (E3) | Toluene |
| 13 | 6.992 | 4.268 (E3) | Heptane |
| 14 | 4.204 | 7.149 (D1) | Toluene |
| 15 | 6.261 | 5.049 (D2) | Toluene |
| 16 | 6.261 | 5.049 (D2) | Heptane |
| 17 | 7.084 | 4.165 (D3) | Heptane |

The aqueous and organic phases were placed in a 500 mL three-necked glass reactor where they were heated to 80° C. and reacted under reflux and continuous mechanical agitation at 320 RPM for 6 h. The solid product was separated from the unreacted organic and aqueous liquid phases by Buchner funnel filtering followed by solvent washing three times with toluene or heptane. The solid samples were then vacuum dried at 80° C. and 0.2 in. Hg. for at least 6 h.

In example 2, 10 milligrams (mg) of poly(dimethyl siloxane) (PDMS)/pDVB copolymer sorbent 2 (sample 2 in Table 1, above) was loaded onto a microbalance in a vapor sorption analyzer instrument (TA Instruments VTI-SA+) and exposed to $D_4$ vapor at various partial pressures relative to saturation, in the range 0.05 to 0.80, at temperatures of 30° C. and 40° C. The PDMS/pDVB copolymer sorbent 2 was synthesized via suspension free-radical polymerization at 80° C. for 6 h at a stir rate of 300 RPM. The dispersed phase consisted of 7.0 mL divinyl benzene monomer, 5.3 mL vinyl-terminated PDMS with an number average degree of polymerization of 5, 12 mL toluene, and 0.132 g azobisisobutyronitrile (AIBN) and the aqueous continuous phase consisted of 240 mL deionized water, 7.92 g sodium chloride, and 1.2 g poly(vinyl alcohol). The mole ratio of divinyl benzene to vinyl-terminated PDMS was 5:1 such that the overall mole ratio of divinyl benzene to siloxane was 1:1. The particles of copolymer were washed with toluene via Soxhlet extraction and vacuum dried at 50° C. and 0.2 mmHg for 8 h.

The reservoir of the organic vapor cell on the vapor sorption analyzer was filled with octamethylcyclotetrasiloxane ($D_4$, available from Dow Corning Corporation of Midland, Mich., USA) and the copolymer prepared as described above was tested. At each combination of temperature and relative pressure, the PDMS/pDVB copolymer sorbent/$D_4$ vapor system reached thermodynamic equilibrium and the final mass of PDMS/pDVB copolymer sorbent and sorbed $D_4$ vapor was recorded. Before each isotherm, the PDMS/pDVB copolymer sorbent was subjected to 2 hours of drying at 120° C. to ensure that any incidentally sorbed mass was removed and to establish the initial 'dry' mass. At each combination of temperature and pressure the equilibrium sorption capacity of PDMS/pDVB copolymer sorbent was recorded in units of mg of $D_4$ vapor sorbed per gram (g) of PDMS/pDVB copolymer sorbent (mg/g). The sorption capacities for PDMS/pDVB copolymer sorbent 2 are included in Table 2.

TABLE 2

| 30° C. | | 40° C. | |
| --- | --- | --- | --- |
| Relative Pressure of $D_4$ | mg/g | Relative Pressure of $D_4$ | mg/g |
| 0.05 | 115 | 0.05 | 105 |
| 0.10 | 142 | 0.10 | 135 |
| 0.20 | 188 | 0.20 | 178 |
| 0.40 | 293 | 0.40 | 263 |
| 0.60 | 404 | 0.60 | 387 |
| 0.80 | 1096 | 0.80 | 868 |

In example 3, 10 milligrams (mg) of poly(dimethyl siloxane) (PDMS)/pDVB copolymer sorbent 3 (copolymer 3 in Table 1, above) was loaded onto a microbalance in a vapor sorption analyzer instrument (TA Instruments VTI-SA+) and exposed to $D_4$ vapor at various partial pressures relative to saturation, in the range 0.05 to 0.80, at temperatures of 30° C. and 40° C. The PDMS/pDVB copolymer sorbent 3 was synthesized via suspension free-radical polymerization at 80° C. for 6 h at a stir rate of 300 RPM. The dispersed phase consisted of 7.5 mL divinyl benzene monomer, 4.6 mL vinylmethyl cyclic siloxanes consisting of predominantly 2,4,6,8-tetramethyl-2,4,6,8-tetravinylcyclotetrasiloxane, 12 mL toluene, and 0.132 g AIBN and the aqueous continuous phase consisted of 240 mL deionized water, 7.92 g sodium chloride, and 1.2 g poly(vinyl alcohol). The mole ratio of divinyl benzene to vinylmethyl cyclic siloxanes was 4:1 such that the overall mole ratio of divinyl benzene to siloxane was approximately 1:1. The particles of crosslinked copolymer were washed with toluene via Soxhlet extraction and vacuum dried at 50° C. and 0.2 mmHg for 8 h. Copolymer sample 3 was tested as described above in example 2. The sorption capacities for PDMS/pDVB copolymer sorbent 3 are included in Table 3.

TABLE 3

| 30° C. | | 40° C. | |
| --- | --- | --- | --- |
| Relative Pressure of $D_4$ | mg/g | Relative Pressure of $D_4$ | mg/g |
| 0.05 | 176 | 0.05 | 165 |
| 0.10 | 229 | 0.10 | 220 |
| 0.20 | 300 | 0.20 | 294 |
| 0.40 | 465 | 0.40 | 399 |
| 0.60 | 680 | 0.60 | 592 |
| 0.80 | 1152 | 0.80 | 1121 |

In comparative example 1, 10 milligrams (mg) of Darco 20-40 mesh activated charcoal was loaded onto a microbalance in a vapor sorption analyzer instrument (TA Instruments VTI-SA+) and exposed to $D_4$ vapor at various partial pressures relative to saturation, in the range 0.05 to 0.80, at temperatures of 30° C. and 40° C. The reservoir of the organic vapor cell on the vapor sorption analyzer was filled with octamethylcyclotetrasiloxane ($D_4$, available from Dow Corning Corporation of Midland, Mich., USA). At each combination of temperature and relative pressure, the activated charcoal/$D_4$ vapor system reached thermodynamic equilibrium and the final mass of activated charcoal and sorbed $D_4$ vapor was recorded. Before each isotherm, the activated charcoal was subjected to 2 hours of drying at 120° C. to ensure that any incidentally sorbed mass was removed and to establish the initial 'dry' mass. At each combination of temperature and pressure the equilibrium sorption capacity of activated charcoal was recorded in units of mg of $D_4$ vapor sorbed per gram (g) of activated charcoal (mg/g). The sorption capacities for activated charcoal are included in Table 4.

TABLE 4

| 30° C. | | 40° C. | |
| --- | --- | --- | --- |
| Relative Pressure of $D_4$ | mg/g | Relative Pressure of $D_4$ | mg/g |
| 0.05 | 114 | 0.05 | 102 |
| 0.10 | 131 | 0.10 | 117 |
| 0.20 | 152 | 0.20 | 139 |
| 0.40 | 194 | 0.40 | 185 |
| 0.60 | 274 | 0.60 | 229 |
| 0.80 | 377 | 0.80 | 345 |

In comparative example 2, 10 milligrams (mg) of poly (divinyl benzene) (pDVB) was loaded onto a microbalance in a vapor sorption analyzer instrument (TA Instruments VTI-SA+) and exposed to $D_4$ vapor at various partial pressures relative to saturation, in the range 0.05 to 0.80, at temperatures of 30° C. and 40° C. The pDVB was synthesized via suspension free-radical polymerization at 80° C. for 6 h at a stir rate of 300 RPM. The organic dispersed phase consisted of 12 mL divinyl benzene monomer, 12 mL toluene, and 0.132 g AIBN and the aqueous continuous phase consisted of 240 mL deionized water, 7.92 g sodium chloride, and 1.2 g poly(vinyl alcohol). The resulting particles of crosslinked polymer were washed with toluene via Soxhlet extraction and vacuum dried at 50° C. and 0.2 mmHg for 8 h. The reservoir of the organic vapor cell on the vapor sorption analyzer was filled with octamethylcyclotetrasiloxane ($D_4$, available from Dow Corning Corporation of Midland, Mich., USA). At each combination of temperature and relative pressure, the pDVB/$D_4$ vapor system reached thermodynamic equilibrium and the final mass of pDVB and sorbed $D_4$ vapor was recorded. Before each isotherm, the pDVB was subjected to 2 hours of drying at 120° C. to ensure that any incidentally sorbed mass was removed and to establish the initial 'dry' mass. At each combination of temperature and pressure the equilibrium sorption capacity of pDVB was recorded in units of mg of $D_4$ vapor sorbed per gram (g) of pDVB (mg/g). The sorption capacities for pDVB are included in Table 5.

TABLE 5

| 30° C. | | 40° C. | |
| --- | --- | --- | --- |
| Relative Pressure of $D_4$ | mg/g | Relative Pressure of $D_4$ | mg/g |
| 0.05 | 284 | 0.05 | 275 |
| 0.10 | 344 | 0.10 | 326 |
| 0.20 | 417 | 0.20 | 408 |
| 0.40 | 512 | 0.40 | 490 |
| 0.60 | 552 | 0.60 | 535 |
| 0.80 | 571 | 0.80 | 557 |

In comparative example 3, a crosslinked polyorganosiloxane elastomer was prepared by mixing a 2-part composition comprising Part A and Part B. Part A was prepared by mixing 99.61 parts of an α,ω-dimethylvinylsiloxy-terminated polydimethylsiloxane having viscosity of 55 Pa·s at 25° C. (Vi-PDMS 1) with 0.39 parts of Karstedt's Pt catalyst dispersion to provide an overall Pt concentration of 10 ppm by weight when combining equal amounts of parts A and B. Part B was prepared by combining 98.54 parts of Vi-PDMS1 with 1.26 parts of polydimethylsiloxane-polyhydridomethylsiloxane copolymer having an average viscosity of 0.03 Pa·s at 25° C. and including 1% H in the form of SiH (Crosslinker 1) and 0.20 parts of methylbutynol. Parts A and B were each independently mixed for two 20 second (s) cycles on a rotary mixer at 3000 rpm. 5.06 g of Part A and 5.06 g of Part B were then combined, mixed for two 20 s mixing cycles, then placed in a vacuum chamber to de-air for 2 minutes in vacuo, before moving the mixture to a forced air convection oven to cure for 3 hours at 85° C. The resulting sample was a clear, dry, non-flowable elastomer, referred to subsequently as Crosslinked Polyorganosiloxane Elastomer 1.

In comparative example 4, a swollen crosslinked polyorganosiloxane elastomer was prepare by mixing a 2-part composition comprising Part A and Part B in the presence of an excess of a good solvent, decamethylcyclopentasiloxane ($D_5$). Part A was prepared by mixing in a polypropylene mixing cup 99.61 parts of Vi-PDMS 1 with 0.39 parts of Karstedt's Pt catalyst dispersion to provide an overall Pt concentration of 10 ppm when combining equal amounts of parts A and B. Part B was prepared by combining 98.54 parts of Vi-PDMS1 with 1.26 parts of Crosslinker 1. Parts A and B were each independently mixed for two 20 s cycles on a Hauschild rotary mixer at approximately 3000 rpm. 0.625 g of Part A was combined with 4.375 g of $D_5$ and mixed for two 20 s mixing cycles. 0.625 g of Part B was combined with 4.375 g of $D_5$ and mixed for two 20 s mixing cycles. Finally, 4.42 g of the $D_5$ containing Part A and 4.42 g of the $D_5$ containing Part B were combined and mixed for two 20 mixing cycles. The sample was then moved to a forced air convection oven to cure for 3 hours at 85° C. The resulting swollen crosslinked polyorganosiloxane elastomer was then placed in a vacuum oven at 150° C. for 24 h under a reduced pressure of 1 inch of Hg. The resulting regenerated elastomer was then re-weighed and confirmed to be completely devoid of residual $D_5$, leaving a regenerated elastomer, referred to subsequently as Crosslinked Polyorganosiloxane Elastomer 2. The resulting sample was a clear, dry, non-flowable solid.

In comparative example 5, $D_4$ vapor sorption in Crosslinked Polyorganosiloxane Elastomer 1 was measured. A 2 mg piece of Crosslinked Polyorganosiloxane Elastomer 1 cut from the sample described in Comparative Example 3 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with octamethylcyclotetrasiloxane ($D_4$). At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the crosslinked polyorganosiloxane elastomer was subjected to 2 hours of drying at 60° C. to ensure that any incidentally sorbed mass was removed and to establish the initial 'dry' mass. At each combination of temperature and pressure the equilibrium sorption capacity of the sorbent was recorded in units of mg of $D_4$ vapor sorbed per g of crosslinked polyorganosiloxane elastomer per atmosphere of (mg/g). The sorption capacities for Crosslinked Polyorganosiloxane Elastomer 1 are included in Table 6. At high relative pressures, equilibration profiles takes over 1000 minutes.

TABLE 6

| 30° C. | | 40° C. | |
| --- | --- | --- | --- |
| Relative Pressure of $D_4$ | mg/g | Relative Pressure of $D_4$ | mg/g |
| 0.02 | 1.43 | 0.02 | 1.14 |
| 0.04 | 6.29 | 0.04 | 6.71 |
| | | 0.8 | 558 |

In comparative example 6, $D_4$ vapor sorption in Crosslinked Polyorganosiloxane Elastomer 2 was measured. A 34 mg piece of Crosslinked Polyorganosiloxane Elastomer 2 cut from the cured sample described in Comparative Example 4 was loaded onto a microbalance in a vapor sorption analyzer instrument (TA Instruments VTI-SA+) and exposed to $D_4$ vapor at various partial pressures relative to saturation at a given temperature. The reservoir of the organic vapor cell on the vapor sorption analyzer was filled with $D_4$. At each combination of temperature and relative pressure, the crosslinked polyorganosiloxane elastomer/$D_4$ vapor system reached thermodynamic equilibrium and the final mass of crosslinked polyorganosiloxane elastomer and sorbed $D_4$ vapor was recorded. Before each isotherm, the Crosslinked Polyorganosiloxane Elastomer 2 sample was subjected to 2 hours of drying at 60° C. to ensure that any incidentally sorbed mass was removed and to establish the initial 'dry' mass. At each combination of temperature and pressure the equilibrium sorption capacity of the Crosslinked Polyorganosiloxane Elastomer 2 was recorded in units of mg of $D_4$ vapor sorbed per g of Crosslinked Polyorganosiloxane Elastomer 2 per atmosphere of (mg/g). The sorption capacities for Crosslinked Polyorganosiloxane Elastomer 2 are included in Table 7. At high relative pressures, equilibration profiles takes over 1000 minutes.

TABLE 7

| 20° C. | | 40° C. | |
| --- | --- | --- | --- |
| Relative Pressure of $D_4$ | mg/g | Relative Pressure of $D_4$ | mg/g |
| .02 | 1.13 | 0.02 | 2.45 |
| .04 | 6.06 | 0.95 | 1214 |
| | | 0.9 | 926 |
| | | 0.8 | 618 |
| | | 0.6 | 329 |
| | | 0.4 | 153 |
| | | 0.2 | 42.5 |
| | | 0.1 | 18.5 |

The comparative examples and examples above show that crosslinked polyorganosiloxane elastomers have similar sorption capacities for $D_4$ to poly(divinylbenzene) polymers, however, the copolymer of divinylbenzene and polyorganosiloxane has an unexpectedly higher sorption capacity for $D_4$ than either a crosslinked polyorganosiloxane elastomer or a poly(divinylbenzene) polymer. The sorption capacities of the crosslinked polyorganosiloxane elastomers in comparative examples 5 and 6 under the tested conditions at 0.8 relative pressure of $D_4$ and 40° C. are 558 and 618 mg/g, respectively. Similar results are shown in comparative example 2, table 2, last line (where relative pressure of $D_4$ of 0.8 at 40° C. had sorption capacity 557 mg/g of $D_4$ for the divinylbenzene polymer). But, in example 2 and example 3, where a copolymer (of divinylbenzene with a polydimethylsiloxane) was tested under the same conditions, sorption capacity was significantly higher at 868 mg/g at 40° C. for example 2 and 1121 mg/g at 40° C. for example 3. These examples show an unexpected synergistic effect at increasing sorption capacity of $D_4$ using the copolymer described herein.

INDUSTRIAL APPLICABILITY

The method described herein is particularly useful for separating a gas or vapor (e.g. $D_4$, $D_5$) from a mixture by contacting the mixture (e.g. cyclics laden silicone fluid or a $D_4$-containing process gas stream) comprising at least one vapor phase organosilicon component with a sorbent comprising a copolymer of a di-alkenyl functional aromatic hydrocarbon and a polyorganosiloxane. Optionally, the copolymer is prepared in the presence of a solvent which is then subsequently substantially removed. The resulting copolymer exhibits an unusually high capacity to sorb $D_4$. Due to the availability and sometimes necessity to separate $D_4$ from streams that are already warm without heat loss from contacting a cold sorbent, as well as the energy and cost savings of being able to use unheated air and/or inert gas streams to regenerate the sorbent, the method described herein employing a copolymer as the sorbent has significant potential consequences for energy and cost-efficiency gains in traditional gas separations. Also disclosed are contacting devices that comprise such sorbents and products purified by such contacting processes, including silicone products and intermediates. Compared to conventional solid adsorbent media or porous organic, polymeric or organometallic structures, the copolymer may be less prone to fouling and mass transfer limitations.

Definitions and Usage of Terms

All amounts, ratios, and percentages are by weight unless otherwise indicated. The articles 'a', 'an', and 'the' each refer to one or more, unless otherwise indicated by the context of the specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

Abbreviations used herein are defined as follows. The abbreviation "cSt" means centiStokes. "DP" means the degree of polymerization. "GC" means gas chromatography. "Pa·s" means Pascal seconds, and "ppm" means parts per million. "Tg" means glass transition temperature.

The term "depleted" and its derivatives each mean that the amount of organosilicon component in the mixture before step 1) is reduced to a lower amount after practicing step 1) of the method described herein.

The term "enriched" and its derivatives mean that the amount of organosilicon component in the crosslinked elastomer is greater during and after practicing step 1) than before practicing step 1) of the method described herein.

The term "sorb" and its derivatives, means absorbing and/or adsorbing; alternatively adsorbing, and alternatively absorbing. Alternatively, sorb can include both absorbing and adsorbing.

The term "volatile" and its derivatives, means that one component may have a higher vapor pressure than another component. In certain embodiments, the organosilicon component may be distinguished from the at least one other component in the mixture by virtue of relative vapor pressures. The organosilicon component may have a vapor pressure higher than the vapor pressure of the at least other component in the mixture. The organosilicon component may have a pure component vapor pressure of at least 0.1 mm Hg at 70° C. The at least one other component in the mixture may be a non-organosilicon component that has a vapor pressure less than 0.1 mmHg at 70° C. (Volatility refers to the tendency of a substance to vaporize. Volatility is directly related to the vapor pressure of a substance. At a given temperature, a substance with a higher vapor pressure vaporizes more readily than a substance with a lower vapor pressure.) IN other embodiments, the organosilicon component may have a vapor pressure lower than vapor pressure of at least one other component in the mixture, when solubility of the organosilicon component is higher in the nonporous crosslinked elastomer than solubility of the at least one other component in the nonporous crosslinked elastomer.

The invention claimed is:

1. A method for depleting an organosilicon component in a mixture comprising the organosilicon component and at least one other component, wherein the method comprises:
   1) sorbing at least some of the organosilicon component by a copolymer of a di-alkenyl functional aromatic hydrocarbon and a polyorganosiloxane, thereby forming a depleted mixture containing less of the organosilicon component than the mixture before sorbing and enriching the copolymer with sorbed organosilicon component thereby forming an enriched copolymer,
   2) desorbing at least some of the sorbed organosilicon component from the enriched copolymer, thereby forming a desorbed organosilicon component and a regenerated copolymer containing less of the sorbed organosilicon component than the enriched copolymer before desorbing, and
   3) using the regenerated copolymer as all or a portion of the copolymer in repeating step 1).

2. The method of claim 1, further comprising: directing to a desired location the depleted mixture during and/or after step 1).

3. The method of claim 1, further comprising directing to a desired location the desorbed organosilicon component during and/or after step 2).

4. The method of claim 1, where the copolymer is an addition reaction product of divinylbenzene and an addition reaction polymerizable polydimethylsiloxane.

5. The method of claim 1, where the organosilicon component is a cyclic polyorganosiloxane with a degree of polymerization from 3 to 12, a silane, or a noncyclic polyorganosiloxane with a degree of polymerization up to 14.

6. The method of claim 1, where the at least one other component of the mixture comprises a non-volatile organic liquid or a non-volatile polyorganosiloxane liquid distinct from the organosilicon component.

7. The method of claim 1, where the mixture is a process vapor/gas stream and the depleted mixture is a depleted process vapor/gas.

8. The method of claim 1, where the copolymer has a form selected from thin films, coated support materials, nanorods, nanospheres, beads, granules, powders, pellets, particulates, and fibers.

9. The method of claim 1, wherein the copolymer is prepared by a method comprising:
i) free-radical polymerization of ingredients comprising:
    a) an aqueous phase comprising:
        i) water,
        optionally ii) a nonionic surfactant, and
        iii) a salt; and
    b) an organic phase comprising
        i) a hydrocarbon solvent,
        ii) a polyorganosiloxane having at least one silicon bonded aliphatically unsaturated hydrocarbon group per molecule,
        iii) an initiator,
        iv) a dialkenyl aromatic hydrocarbon monomer, and
        optionally v) a mono-alkenyl aromatic monomer; and
ii) thereafter removing the hydrocarbon solvent.

10. The method of claim 9, the polyorganosiloxane is selected from (A) mono vinyl terminated polydimethylsiloxane, (B) α,ω-vinyl terminated polydimethylsiloxane, (C) cyclic poly(methyl/vinyl siloxane) having a degree of polymerization from 3 to 10, (D) α,ω-methacryloxypropyl terminated polydimethylsiloxane, and (E) methacryloxypropyl terminated polydimethylsiloxane.

11. The method of claim 9, where step iii is performed by heating.

12. The method of claim 1, where step 2) is performed by a technique selected from a) heating, b) reducing a partial pressure of the organosilicon component, or c) both a) and b).

13. The method of claim 9, where the dialkenyl aromatic hydrocarbon monomer comprises divinyl benzene or diallyl benzene.

14. The method of claim 9, where the mono-alkenyl aromatic hydrocarbon monomer is present in the organic phase in an amount of 1 to 90 parts per 100 parts by weight of the organic phase, and the mono-alkenyl aromatic hydrocarbon monomer is selected from the group consisting of styrene, ethylvinylbenzene and methylvinyl benzene.

15. The method of claim 9, where the initiator is selected from the group consisting of azo compounds, organic peroxides, and organoboron compounds capable of forming free radical generating species.

16. The method of claim 9, where the aqueous phase contains 0.0001 to 10 parts nonionic surfactant per 100 parts of aqueous phase by weight, and the nonionic surfactant is selected from the group consisting of polyoxyethylene alkyl ethers, polyoxyethylene alkyl phenyl ethers, alkylglucosides, polyoxyethylene fatty acid esters, sorbitan fatty acid esters, polyoxyethylene sorbitan fatty acid esters, and fatty alcohols.

17. The method of claim 9, where the salt is selected from the group consisting of sodium halide and potassium halide.

* * * * *